(12) United States Patent
Lavoie

(10) Patent No.: US 9,457,500 B2
(45) Date of Patent: Oct. 4, 2016

(54) PRODUCTION OF EXTRUDED FOAM

(75) Inventor: Bernard Lavoie, Magog (CA)

(73) Assignee: Gurit (UK) Ltd., Newport, Isle of Wight (GB)

( * ) Notice: Subject to any disclaimer, the term of this patent is extended or adjusted under 35 U.S.C. 154(b) by 918 days.

(21) Appl. No.: 13/501,793

(22) PCT Filed: Oct. 13, 2010

(86) PCT No.: PCT/EP2010/065317
§ 371 (c)(1),
(2), (4) Date: Jun. 11, 2012

(87) PCT Pub. No.: WO2011/045335
PCT Pub. Date: Apr. 21, 2011

(65) Prior Publication Data
US 2012/0248645 A1    Oct. 4, 2012

(30) Foreign Application Priority Data
Oct. 13, 2009   (GB) .................................. 0917884.9

(51) Int. Cl.
*B29C 47/06* (2006.01)
*B29C 44/56* (2006.01)
(Continued)

(52) U.S. Cl.
CPC .......... *B29C 44/5654* (2013.01); *B29C 44/24* (2013.01); *B29C 44/352* (2013.01); *B32B 5/32* (2013.01); *B32B 37/02* (2013.01); *B32B 37/153* (2013.01); *B65H 45/101* (2013.01); *B29K 2025/00* (2013.01); *B29K 2067/00* (2013.01); *B29K 2105/04* (2013.01);
(Continued)

(58) Field of Classification Search
CPC ..... B29C 44/06; B29C 44/065; B29C 44/24;
B29C 44/3461; B29C 44/352; B29C 44/46;
B29C 44/461; B29C 44/467; B29C 44/5654;
B29C 47/0019; B29C 47/0023; B29C
47/0047; B29C 47/0064; B29C 67/0051;
B29C 67/0055; B29D 99/001; B32B 3/18;
B32B 5/32; B32B 2250/22; B32B 2305/022;
B32B 2309/08; B32B 37/02; B32B 37/04;
B32B 37/06; B32B 37/065; B32B 37/15;
B32B 37/153; B32B 2038/0028; B32B 38/0004
See application file for complete search history.

(56) References Cited

U.S. PATENT DOCUMENTS 3,645,837 A    2/1972   Chisholm et al.
3,813,040 A *   5/1974   Heinemeyer .................. 238/84
(Continued)

FOREIGN PATENT DOCUMENTS

CN    1871170 A    11/2006
DE    103 13 688 A1    10/2004
(Continued)

OTHER PUBLICATIONS

Mar. 31, 2014 Office Action in corresponding CN Application No. 201080052959.X.
Mar. 17, 2011 International Search Report and Written Opinion in PCT/EP2010/065317.
(Continued)

*Primary Examiner* — James Sanders
(74) *Attorney, Agent, or Firm* — Therese A. Hendricks

(57) ABSTRACT

A method of producing a laminated body of structural thermoplastic foam, the method comprising the step of successively extruding a plurality of foam layers from an extrusion die, each next layer being extruded onto a previously extruded layer, to form a stack of mutually bonded layers.

25 Claims, 7 Drawing Sheets

(51) Int. Cl.

| | |
|---|---|
| *B29C 44/24* | (2006.01) |
| *B29C 44/34* | (2006.01) |
| *B32B 5/32* | (2006.01) |
| *B32B 37/02* | (2006.01) |
| *B32B 37/15* | (2006.01) |
| *B65H 45/101* | (2006.01) |
| *B29K 25/00* | (2006.01) |
| *B29K 67/00* | (2006.01) |
| *B29K 105/04* | (2006.01) |
| *B29L 9/00* | (2006.01) |
| *B32B 37/04* | (2006.01) |
| *B32B 38/00* | (2006.01) |
| *B32B 39/00* | (2006.01) |
| *B32B 43/00* | (2006.01) |

(52) U.S. Cl.
CPC ........... *B29L 2009/00* (2013.01); *B32B 37/04* (2013.01); *B32B 38/0004* (2013.01); *B32B 39/00* (2013.01); *B32B 43/003* (2013.01); *B32B 2038/0028* (2013.01); *B32B 2250/22* (2013.01); *B32B 2266/0207* (2013.01); *B32B 2266/0228* (2013.01); *B32B 2266/0264* (2013.01); *B32B 2305/022* (2013.01); *B32B 2305/08* (2013.01); *B32B 2307/718* (2013.01); *B32B 2309/08* (2013.01); *B32B 2310/0825* (2013.01); *B32B 2603/00* (2013.01)

(56) References Cited

U.S. PATENT DOCUMENTS

| | | | |
|---|---|---|---|
| 3,857,914 A * | 12/1974 | Aishima et al. | 264/45.5 |
| 3,956,438 A | 5/1976 | Schippers | |
| 5,121,329 A * | 6/1992 | Crump | 700/119 |
| 5,882,776 A * | 3/1999 | Bambara et al. | 428/215 |
| 6,245,266 B1 * | 6/2001 | Ramesh et al. | 264/51 |
| 7,211,162 B2 * | 5/2007 | Okuda et al. | 156/78 |
| 7,236,166 B2 * | 6/2007 | Zinniel et al. | 345/419 |
| 2005/0017411 A1 * | 1/2005 | Yang et al. | 264/319 |
| 2006/0255523 A1 | 11/2006 | Steyer | |
| 2008/0105991 A1 | 5/2008 | Rakutt et al. | |

FOREIGN PATENT DOCUMENTS

| | | | |
|---|---|---|---|
| GB | 1439438 A | | 6/1976 |
| JP | 1136717 | | 9/1989 |
| JP | 11320738 A | | 11/1999 |
| JP | 2000-334896 A | | 12/2000 |
| JP | 2007-320264 A | | 12/2007 |
| JP | 2008-73939 A | | 4/2008 |
| WO | WO 2008/008875 A2 | | 1/2008 |
| WO | 2009119696 A1 | | 10/2009 |
| WO | WO 2009/119696 A | | 10/2009 |

OTHER PUBLICATIONS

Oct. 13, 2011 Combined Search Report and Examination Report in GB 0917884.9.

Examination Report dated Apr. 26, 2016 in corresponding European Patent Application 10768467.2-1703.

* cited by examiner

PRODUCTION OF EXTRUDED FOAM

FIELD OF THE INVENTION

The present invention relates to a method of, and an apparatus for, producing extruded thermoplastic foam. In particular, the present invention relates to the manufacture of a laminated body of structural thermoplastic foam for use as a core material in a sandwich panel, for example in a wind turbine blade.

BACKGROUND

It is known to use a thermoplastic foam core to manufacture a variety of different sandwich panel structures. The foam core is a sheet sandwiched between outer plies, for example plies of fibre reinforced composite material. Such foam cores may be used to manufacture wind turbine blades. The core is required to have high mechanical properties, such as shear strength, compressive strength, shear modulus and compressive modulus. The foam is also required to have the correct thickness and length dimensions to form the core, sometimes the core being formed by plural interlocking foam parts extending in series along the lengthwise direction of the blade.

There is a general need to reduce the cost of the foam core. It is known to produce a foam core, for example of polyethylene terephthalate (PET) foam, by a direct extrusion process. That process has a low cost. Current PET direct extrusion foam cores have high and variable cell sizes and lower specific mechanical properties than other commercially available structural foams, such as Corecell available in commerce from Gurit (UK) Limited, which have been produced by other than an extrusion process, for example by expansion of foam pellets in a closed mould. Wind blade manufacturers use the direct extrusion PET foam for application where lower mechanical properties can be tolerated and where lower cost is a primary consideration.

The general known process to manufacture thermoplastic foam consists in extruding a continuous foam board and cutting to length at the end of the extrusion line after the board has cooled down. The foam board dimensions may vary from one manufacturer to another. Generally the thickness of the board cannot be too high because of limitations on the dimensions of the extrusion die, and because of the need to keep the board shape constant. The foam board could collapse under its own weight if the thickness is too high at the die exit.

To achieve the final foam sheet dimensions, most manufacturers are required to weld a number of foam boards together to form a block, and then the block is sliced to form a sheet, with the cell direction of the extruded foam being in the desired orientation and determined by the cutting direction. Before welding, each face of the board to be welded is required to be surfaced to ensure a high level of planarity and thus a good adhesion to the adjacent face welded thereto. The surfacing process generates over 25% of material removed (scrap for regrind) from the board. This is wasteful.

US2008/105991A1 discloses a foam manufacturing process in which, similarly, a plurality of foam boards are welded together to form a laminated block after the plurality of foam boards have been produced.

Instead of welding, it is possible to use an additional adhesion step using an applied adhesive layer to adhere adjacent foam faces together.

The use of welding or adhesion steps of the plural extruded foam boards increases the cost and complexity of the production of multi-layer structural foam laminates.

It is known to produce laminates of foamed material but the manufacturing apparatus may be complicated and expensive, and may require co-extrusion, and/or the laminates so formed may not be multi-layer structural foam laminates which are suitable, for example, to produce a laminated body of structural thermoplastic foam for use as a core material in a sandwich panel, for example in a wind turbine blade.

GB-A-1439438 discloses co-extruding laminates of foamed polymeric material from a die having plural input streams, for example in which an annular bi-layer is co-extruded around a mandrel.

GB-A-2044672 discloses a laminating process and apparatus in which preformed thermoplastic sheets are passed through a furnace in which the sheets are expanded and welded together.

U.S. Pat. No. 3,645,837 discloses the production of co-extruded thermoplastic laminates from a die having plural input streams.

JP-A-1136717 discloses the lamination of three foamed layers in the same die into a three-layered sheet.

JP-A-2008073939 discloses a foamed laminated sheet having different open cell ratios in different layers.

JP-A-2007320264 discloses a co-extruded multilayer foamed sheet.

JP-A-2000334896 discloses a multilayer foamed sheet.

JP-A-11320738 discloses the production of a foamed laminated sheet in which a first resin layer is extruded from a first extruder in a sheet-like state, and then foamed by electron beam irradiation and then heating to form a first foam layer, a second resin layer is extruded from a second extruder in a sheet-like state onto the first foam layer, and then crosslinked and foamed to form a second foam layer, and further foam layers are sequentially molded, by respective further extruders, in a multilayer to the upper surfaces of the further formed layers.

SUMMARY OF THE INVENTION

It is an aim of the present invention to overcome these problems of known manufacturing process for producing structural thermoplastic foam laminates.

The present invention accordingly provides a method of producing a laminated body of structural thermoplastic foam, the method comprising the step of successively extruding a plurality of foam layers from an extrusion die, each next layer being extruded onto a previously extruded layer, to form a stack of mutually bonded layers, the same extrusion die forming a plurality of individually extruded layers of the stack.

Optionally, the extrusion die and the stack are relatively moved translationally during extrusion of each foam layer.

Optionally, a single extrusion die extrudes all of the layers of the stack.

The present invention also provides an apparatus for producing a laminated body of structural thermoplastic foam, the apparatus comprising an extrusion die for extruding a foam layer, a support mounted beneath the extrusion die, the support being adapted to support at least one block comprising a stack of mutually bonded foam layers so that a foam layer can be extruded from the extrusion die onto a previously extruded layer at the top of the block, and a conveyor system on the support, the conveyor system being adapted translationally to move at least one block under the extrusion die during extrusion of each foam layer.

Preferred features are defined in the dependent claims.

The preferred embodiments of the present invention can provide a manufacturing process for producing structural foam laminates which can make it possible to eliminate post welding and gluing operations as employed in the known processes described above. The preferred embodiments can also reduce the amount of waste foam material produced, for example by only requiring a final regrinding step of the outer surfaces of the laminated product. The waste can be reduced to less than 10 wt % of the initial foam employed to produce the laminated product. Additionally, final foam sheet can provide a final foam sheet having improved mechanical properties as compared to an adhered laminated sheet.

The preferred embodiments of the present invention can provide the production of extruded foam comprising PET, styrene acrylonitrile (SAN), polystyrene (PS) or a blend of PS and polyphenylene oxide (PPO) using extrusion lamination to easily manufacture high quality foam without a post welding or adhering operation. The manufacturing cost of the extruded foam may be very low compared to the known laminated foams using post welding or adhering to for the laminated structure.

BRIEF DESCRIPTION OF THE DRAWINGS

Embodiments of the present invention will now be described with reference to the accompanying drawings, in which.

DETAILED DESCRIPTION

The method of the preferred embodiments of the present invention comprises extruding successive layers of foam from an extrusion die onto a movable surface to form a vertical stack of mutually bonded layers, the surface being either the top of a horizontally movable table, for the first and lowermost layer of the stack, and the upper surface of the respective preceding layer for the remaining layers of the stack. This forms a solid block of a multilayer foam on the movable surface on a single production line incorporating the extrusion die and the movable table, without requiring an additional off-line welding or gluing process. The foam comprises a thermoplastic material, such as polyethylene terephthalate (PET), styrene acrylonitrile (SAN) polystyrene (PS) or a blend of PS and polyphenylene oxide (PPO), although other thermoplastic materials could be employed in accordance with the invention. The foam may be a closed cell foam, although an open cell foam may be made if desired. A variety of different cell sizes may be employed.

Figure 1:
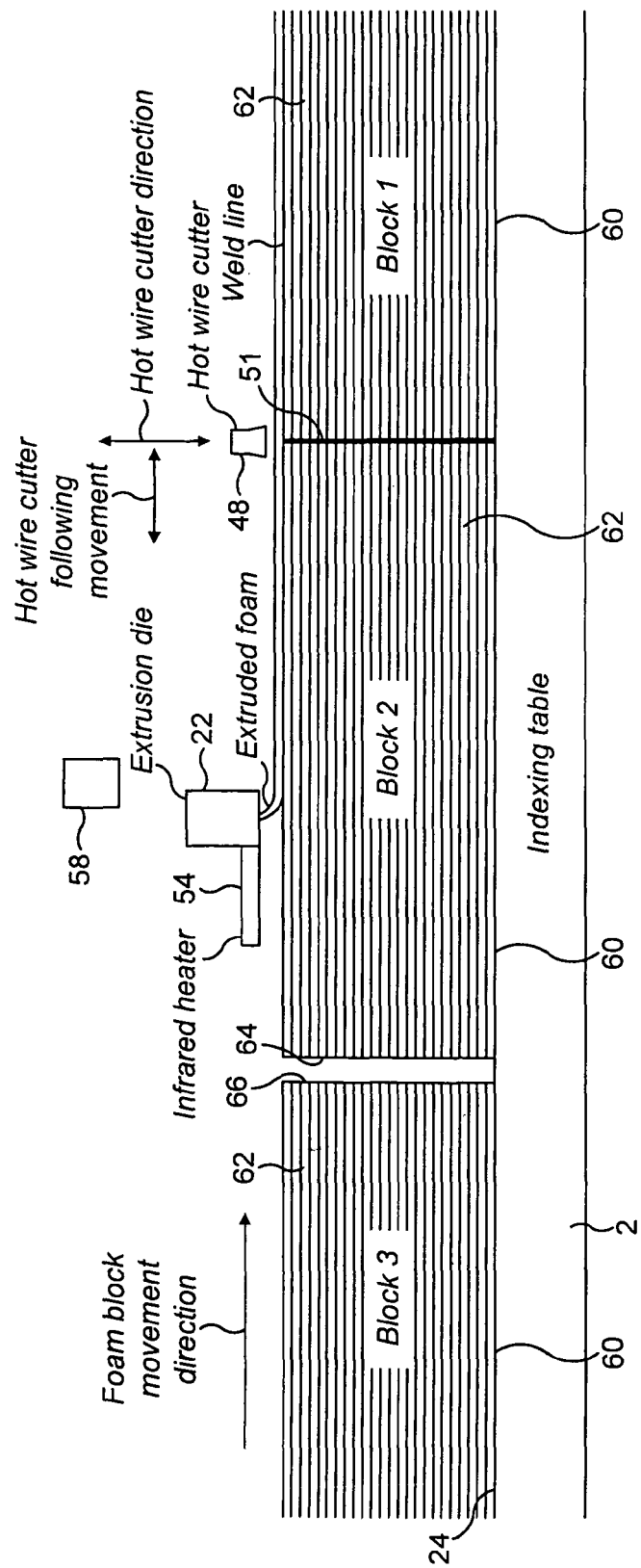
FIG. 1 is a schematic side view of a part of an apparatus for producing extruded foam in the form of a laminated body of structural foam layers in accordance with a first embodiment of the present invention.
Figure 2:
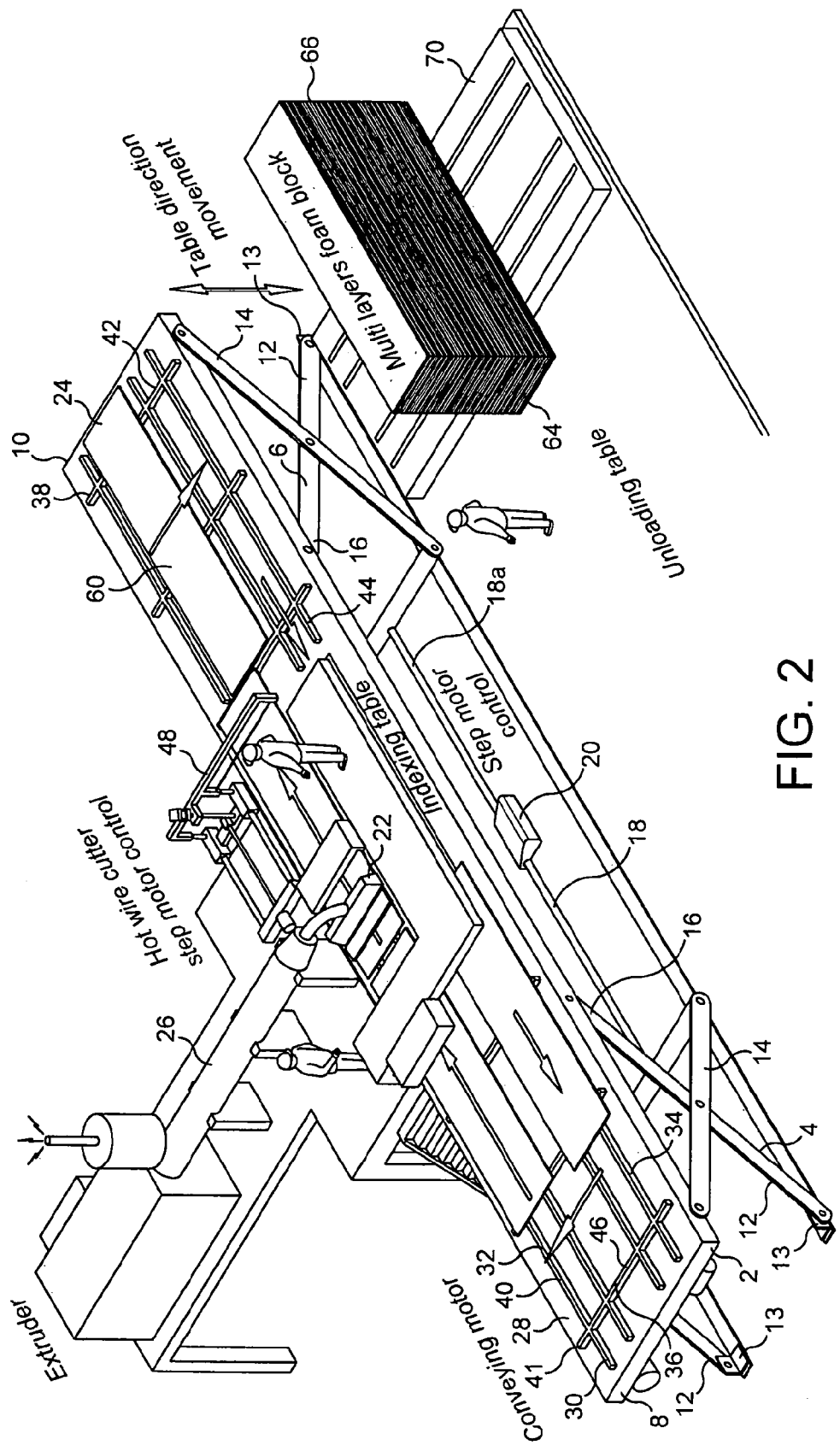
FIG. 2 is a schematic perspective view of the apparatus of FIG. 1 showing the entire indexing table comprising a conveyor system for the foam bodies.
Figure 3:
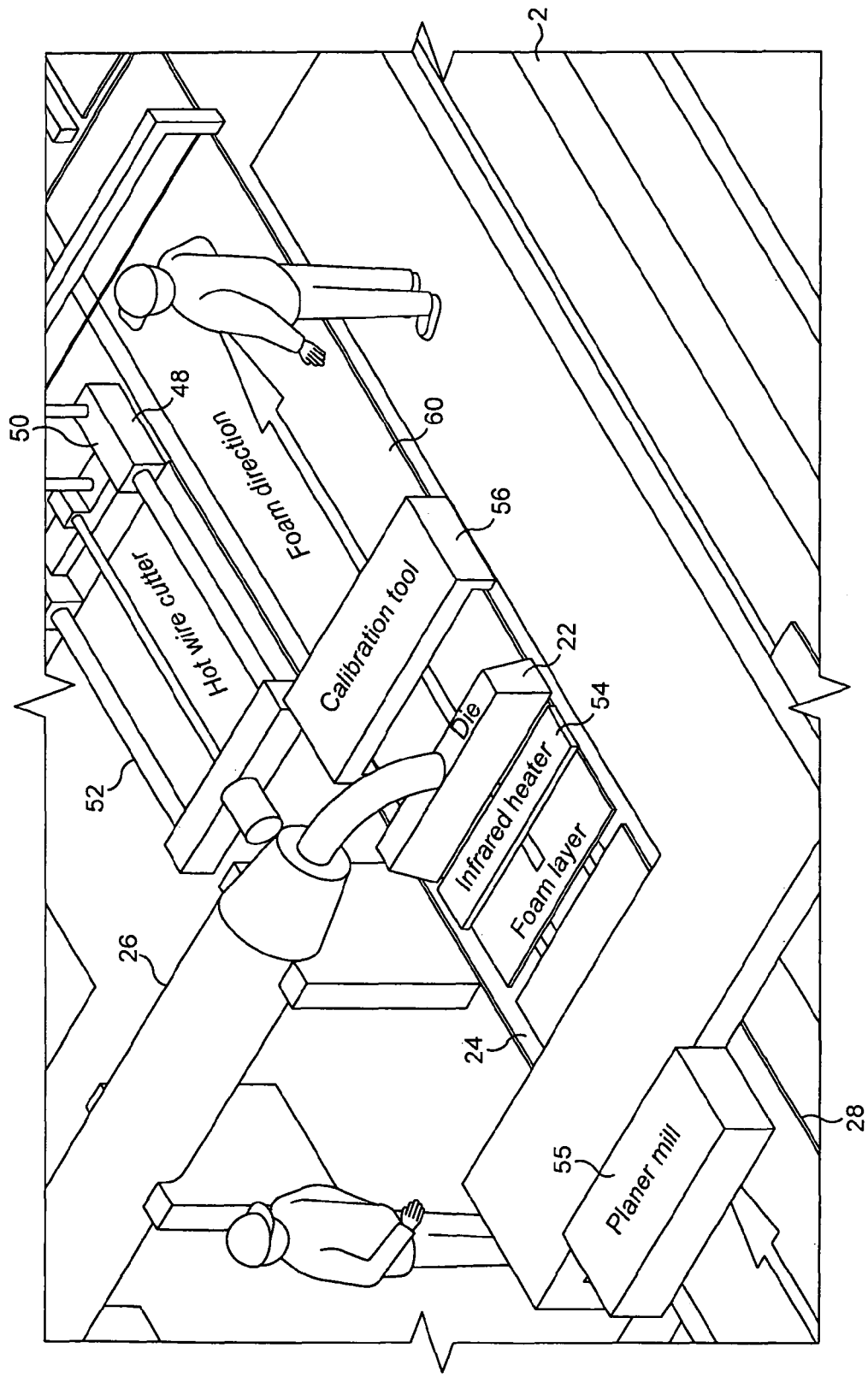
FIG. 3 is an enlarged schematic perspective view of part of FIG. 2.

Referring to FIGS. 1, 2 and 3, an elongate indexing table 2 is mounted on a pair of scissor supports 4, 6, each located at a respective end 8, 10 of the table 2. Each scissor support 4, 6 has two pairs of articulated legs 12, 14, one on each side of the table 2. One leg 12 of each pair is pivotally mounted at one lower end thereof to a fixed base 13 and at the other upper end to a slider 16 mounted under the table 2. The other leg 14 of each pair is pivotally mounted at one lower end thereof to a respective longitudinal screw element 18, 18a and at the other end to the respective table end 8, 10. The two longitudinal screw elements 18, 18a are coupled to a stepper motor 20 which is selectively actuatable to rotate the longitudinal screw elements 18, 18a so as either to draw the longitudinal screw elements 18, 18a towards each other, which causes lowering of the vertical height of the table surface 24, or to urge the longitudinal screw elements 18, 18a away from each other, which causes raising of the vertical height of the table surface 24. The stepper motor 20 is actuatable in an indexable manner, so that the table height is at least lowered incrementally by a predetermined distance. As will be seem from the following description, the predetermined distance corresponds to the thickness of an individual extruded foam layer.

An extrusion die 22 is mounted above the table upper surface 24. The extrusion die 22 is coupled to a foam extruder 26. The outlet of the extrusion die 22 is rectangular, having a length selected to provide a desired width of a foam board to be extruded and a width selected to provide a desired thickness of the foam board.

The extrusion die 22 has a fixed position. The table 2 is provided on its upper surface 24 with a conveyor system 28 for conveying foam boards, and stacks thereof, in one direction around an annular loop 30, the loop typically being rectangular and corresponding to the geometry of the table upper surface 24. The loop 30 has two opposed long sides 32, 34 and two short ends 36, 38, the latter each being located at a respective end 8, 10 of the table 2. The extrusion die 22 is mounted along one long side 32. The conveyor system 28 may comprise, for each of the long sides 32, 34 and short ends 36, 38, an individually actuatable conveyor 40, 42, 44, 46, each comprising, for example, one or more rotatable endless belts 41.

A foam cutter 48 is located downstream, in the direction of movement of the foam sheets around the loop 30, of the extrusion die 22. The foam cutter 48 may comprise a hot wire, which is known in the art per se. and can be moved downwards to cut vertically through a foam layer thereunder. The foam cutter is mounted on a carriage 50 which is adapted to be translatable by a drive system 52 along a direction parallel to the direction of the conveyor located thereunder. The foam cutter 48 can be operated to cut through a foam layer while being moved translationally by the carriage 50 at the same velocity as the foam layer which is being moved by the conveyor 40 to ensure that the foam layer is cut vertically by the foam cutter 50.

An infrared radiant heater 54 is optionally located upstream, in the direction of movement of the foam sheets around the loop 30, of the extrusion die 22. The infrared radiant heater 54 is provided to soften the uppermost foam surface before applying the next foam layer thereto. The infrared radiant heater 54 is adapted to heat the uppermost surface of the foam immediately upstream of the extrusion die 22 so that freshly extruded foam is deposited onto a heated, and preferably an at least partially molten, foam surface, thereby causing enhanced adhesion and fusing of the foam layers together to form a weld. In addition, a calibration tool 56 may be installed immediately downstream of the extrusion die 22 so that freshly extruded foam is guided and shaped to provide a planar upper surface and the desired thickness and width of the foam layer.

Optionally, a planer mill 55 is located upstream of the infrared heater to planarise the upper surface of the foam layer 60 onto which a subsequent foam layer is to be extruded.

A controller 58 controls the operation of the conveyor system 28, the stepper motor 20 and the foam cutter 48 on carriage 50 so as to synchronise the simultaneous or sequential operation of these various elements in accordance with the method disclosed in greater detail below. The foam extruder 26 operates continuously to extrude foam through the extrusion die 22.

In accordance with the method to produce multilayer foam blocks, the extrusion die 22 extrudes foam layers onto the conveyor system 24 on the table 2. Initially, the indexable table 2 is disposed at a high position. The extrusion die 22 extrudes a foam layer 60 onto the moving conveyor 40, or onto the upper surface of a previously extruded foam layer 60, disposed beneath the die 22. To keep a constant flow of foam from the die 22, each layer is applied by moving the conveyor 40 continuously in the same direction. When a layer 60 of greater than the desired block length has been applied, the layer 60 is cut to the desired length by the hot wire foam cutter 48. The hot wire cutter 48 is moved on the carriage 50 and follows the block speed when it cuts the layer 60, forming a cut 51 through the individual foam layer 60. The cut 51 is aligned with previous cuts 51 to earlier deposited foam layers 60 to from a continuous cut face at each end 64, 66 of the block 62 so that each end face of the block 62 is substantially planar. The arrows show the direction of movement of the blocks 62 on the conveyor system 28. A minimum of three blocks are made continuously.

Typically, the die 22 extrudes foam layers having a width of 610 mm and a thickness of 50 mm at an extrusion rate of 500 kg/hour. Alternatively, the die 22 may extrude foam layers having a width of 1220 mm and a thickness of 25 mm at the same extrusion rate. Such a foam layer having a width of greater than 1 meter can be used directly to foam a layer stack of sufficient width for use as a core for a large structural sandwich component such as a typical wind turbine blade. If a narrower width stack is formed, this may require the bonding together of two adjacent stacks along a common longitudinal edge. The foam typically has a density of 110 kg/m3. The die 22 preferably has a rectangular shape with a greater dimension in the width direction, corresponding to the width of the extruded foam layer, than in the height direction, corresponding to the thickness of the extruded foam layer, i.e. a narrow "letterbox" shape, for example having a width/height aspect ratio of at least 10. This can provide a high quality foam by providing a high pressure drop across the die, particularly when a small extruder system of lower extrusion pressure is employed.

In a preferred embodiment, the stack of layers 60 comprising the block 62 is translationally moved by the conveyor 40 at a velocity greater than the velocity of the extruded foam layer 60 exiting the extrusion die 22 thereby anisotropically stretching cells of the foam layer 60 in the moving direction as the extruded layer is deposited onto the previous layer 60.

After cutting, the conveyor system 28 increases speed to separate the leading block 62 from the rearward block 62 which is still under the extrusion die 22. After the leading block 62 has been cut, the conveyor system 28 moves the leading block 62 around the loop 30, by sequential operation of the conveyors 42, 44 and 46, so that the leading block 62 is disposed at the upstream position relative to the die 22, and becomes the rearmost block 62 ready for sequential extrusion of a further layer of foam 60 onto the upper surface of the block 62 from the continuously operating die 22.

In a modification, it is possible to apply additional different laminar materials between each layer, such as fibre glass reinforcement, plastic mesh reinforcement, etc. The layer can be applied before the extrusion (and radiant heating, if present). This provides a series of the laminar material, in spaced configuration, in the ultimately produced block 62, each between a respective pair of foam layers 60.

After a layer 60 has been applied by the extrusion die 22 onto the uppermost surface of all of the circulating blocks 62 on the conveyor system 28, so that the blocks 62 then all have a common number of layers, the stepper motor 20 is actuated to index the table 2 downwardly by a distance corresponding to the layer thickness, in order for the next layer 60 to be deposited onto the succession of blocks 62 on the conveyor system 28.

When all of the blocks 62 have the desired number of layers 60, the table 2 may be lowered to a completely down position. Then, the blocks 62 are unloaded on a further conveyor 70 and are conveyed to a final cutting station in which each block 62 is cut into a plurality of sheets 74.

Prior to cutting, the block 62 may be subjected to a shaping step using a grinding tool (not shown) so that the block 62 surfaces are squared at the final dimension prior to cutting of slices therefrom forming the final foam sheets 74. If such a grinding step is used, the amount of regrind material produced is likely to be less than 10 wt % of the initial foam block. This proportion of regrind waste is significantly lower than using the known step of regrinding to shape individual sheets prior to welding, as discussed above.

Figure 4:
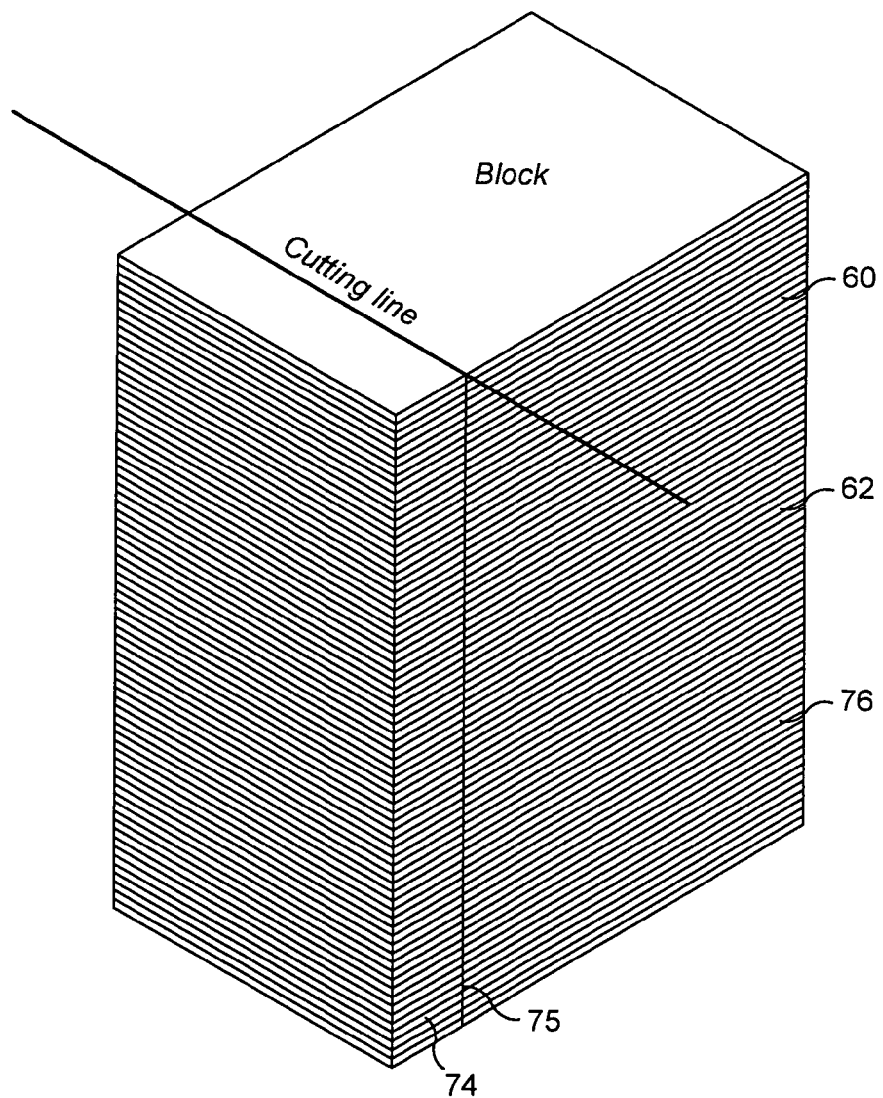
FIG. 4 is a schematic perspective view of a foam block produced by the apparatus of FIGS. 1 and 2 showing how the foam block is subsequently cut into individual sheets.

The cutting step is illustrated in FIG. 4. The block 62 comprises a vertical stack of horizontal layers 60. The block 62 is cut into a plurality of flat sheets 74 by cutting vertical cuts 75 through the entire block 62. The cutting may be executed using a cutting device (not shown) such as a hot wire cutter or a saw blade. In a particularly preferred embodiment, the cutting is carried out by a parallel array of a plurality of hot wire cutters. Such an arrangement provides a particular advantage in the final cutting step because it eliminates the undesired generation of dust and can cut all sheets from the same block at the same time.

This cutting step provides a foam sheet 74 having both the foam extrusion direction and the planar welds 76 between adjacent layers 60 oriented in the through thickness direction of the sheet 74. This provides the sheet 74 with anisotropic mechanical properties which are maximised in the through thickness direction, which is beneficial when the sheet 74 is to be used as a core in a composite material sandwich panel.

After removal of the blocks 62 therefrom, the table 2 is raised by operation of the stepper motor 20 to be placed in a high position ready to receive an initial extruded foam layer 60 of a subsequent series of blocks 62.

In a modified embodiment (not illustrated), the indexing table 2 may be split into two or three (or more) segments, each segment being independently vertically movable by a respective drive system. With such an arrangement, the table segment disposed under the extrusion die 22 may be disposed in its raised position and in the process of receiving an initial extruded foam layer of a subsequent series of blocks while one or more other table segments is in a lowered position and in the process of delivering the previous series of blocks to the cutting mechanism. Such an arrangement can increase block throughput and productivity.

Figure 5:
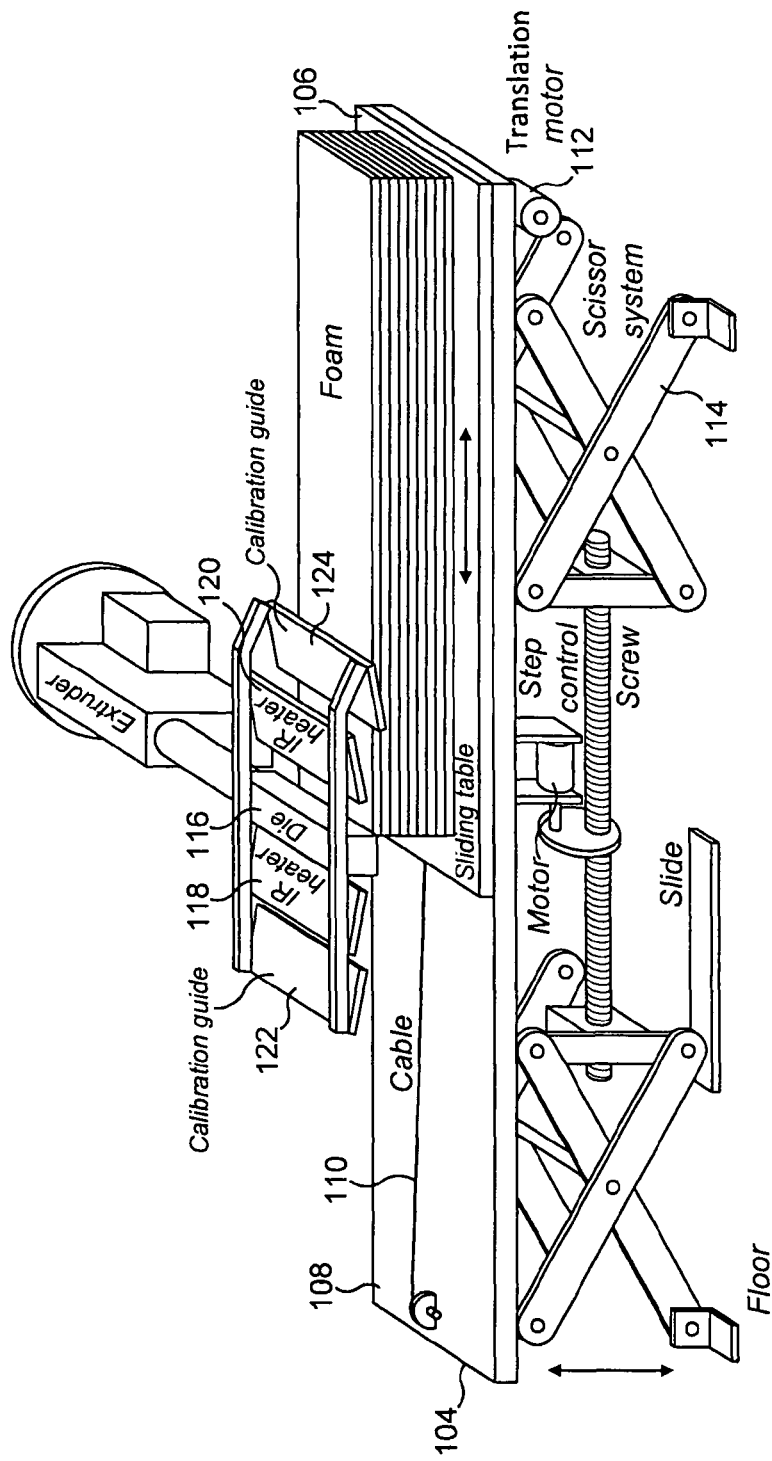
FIG. 5 is a schematic side view of an apparatus for producing extruded foam in the form of a laminated body of structural foam layers in accordance with a second embodiment of the present invention.

FIG. 5 illustrates a second embodiment of the present invention. In this embodiment, the table 104 is modified as compared to that of the first embodiment and comprises a table top 106 mounted for reciprocable linear sliding motion along an elongate table base 108. A cable 110 is fitted to the table top 106 and connected to a rotary motor 112 which can selectively be driven in opposite rotational directions to slide the table top 106 in opposite translational directions. The table base 108 is mounted on an indexable height adjusting system 114, similar to that of the first embodiment. The extrusion die 116, fixedly mounted, is provided with a pair of infrared heaters 118, 120 each on a respective side of the extrusion die 116. On each side of the extrusion die 116, and on the other side of the respective infrared heater 118, 120, a respective calibration tool 122, 124 may be installed to guide and shape the foam layer.

In operation, foam is extruded onto the table top 106 either as a first layer or as a subsequent layer, and during the extrusion step the table top 106 is translationally moved in a first direction along the table base 108 by the motor 110. After each layer is laid, the table 104 is moved down an indexed dimension corresponding to a layer thickness by the indexable height adjusting system 114. Then the table top 106 is translationally moved in a second direction, opposite to the first direction, and the subsequent layer is extruded and deposited onto the previous layer. As for the first embodiment, the infrared heaters 116, 118 activate the surface adherence for the next layer. When the block has the desired thickness, the block is slid off the table 104 and conveyed to a cutting station. The table 104 is moved upwardly by the indexable height adjusting system 114 to the starting position for another block.

Figure 6:
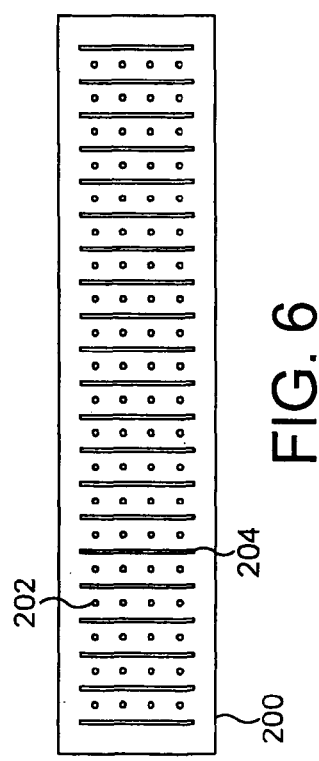

Referring to FIG. 6, there is shown a modified extrusion die 200 for use in embodiments of the apparatus and method of the present invention. The extrusion die 200 has an array of a plurality of extrusion orifices 202 for co-extruding a plurality of foam segments. The extrusion orifices 202 comprise holes typically of rectangular or square cross-section. The array of extrusion orifices 202 extends in both a width direction, corresponding to the width of the foam layer, and a height direction, corresponding to the thickness of the foam layer, of the extrusion die 200. The extrusion die 200 also a plurality of linear elongate orifices 204 which are adapted to extrude unfoamed walls between the foam segments. The linear elongate orifices 204 extend in the height direction of the extrusion die 200, and extend for substantially the entire height. Thus in the embodiment illustrated each group of extrusion orifices 202 for extruding foam, the group typically comprising four orifices 202 spaced in a vertical direction which is in the height direction of the extrusion die 200 in use, is adjacent to a linear orifice 204, also vertically oriented.

Figure 7:
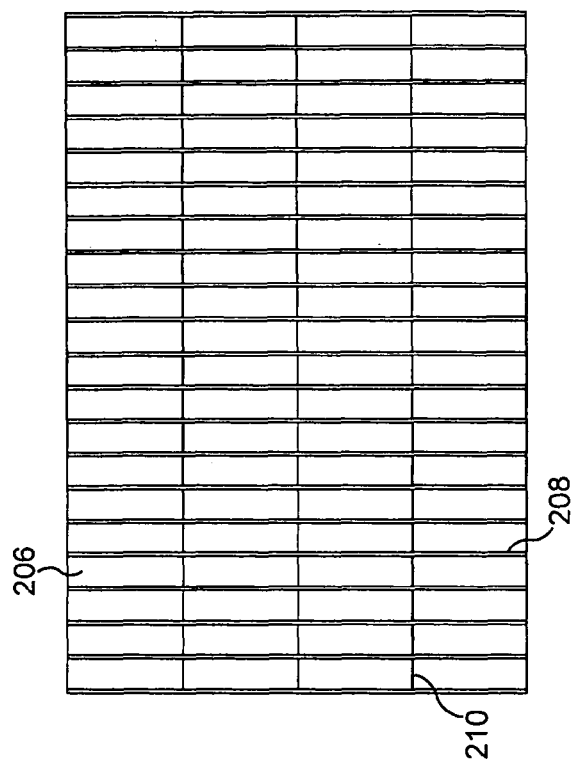

As shown in FIG. 7, the resultant co-extruded layer comprises columns of foam segments 206 mutually bonded in the width direction by unfoamed walls 208 which extend in the thickness direction of the layer, and throughout the entire thickness of the layer. In addition, the co-extruded layer comprises rows of foam segments 206 mutually bonded in the thickness direction by interconnected segment surfaces 210 which extend in the width direction of the layer. Adjacent layers of the stack are disposed one above the other so that the unfoamed walls 208 of adjacent layers intersect. In the block 62, this forms a series of parallel unfoamed walls 208 extending through the entire thickness of the block 62.

Figure 8:
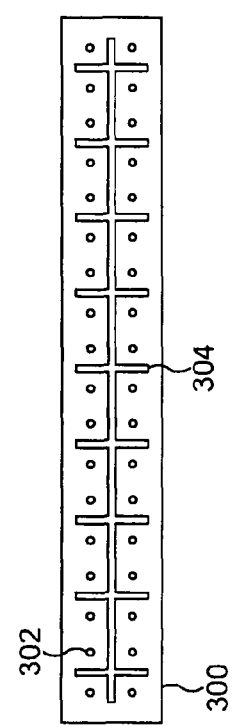

Referring to FIG. 8, there is shown another modified extrusion die 300. The extrusion die 300 has an array of a plurality of extrusion orifices 302 for co-extruding a plurality of foam segments. Again, the extrusion orifices 302 comprise holes typically of rectangular or square cross-section. The array of extrusion orifices 302 extends in both a width direction and a height direction of the extrusion die 300. The extrusion die 300 also a plurality of linear elongate orifices 304 which are adapted to extrude unfoamed walls between the foam segments. The linear elongate orifices 304 extend in the both the height direction and the width direction of the extrusion die 300 to form a network of intersecting mutually orthogonal elongate second orifices 304 in the extrusion die 300. The network extends throughout substantially the entire height and width of the extrusion die 300. Thus in the embodiment illustrated a group of extrusion orifices 302 for extruding foam, the group typically comprising two orifices 302 spaced in a horizontal direction, is separated from an adjacent group by the network of intersecting mutually orthogonal elongate second orifices 304.

Figure 9:
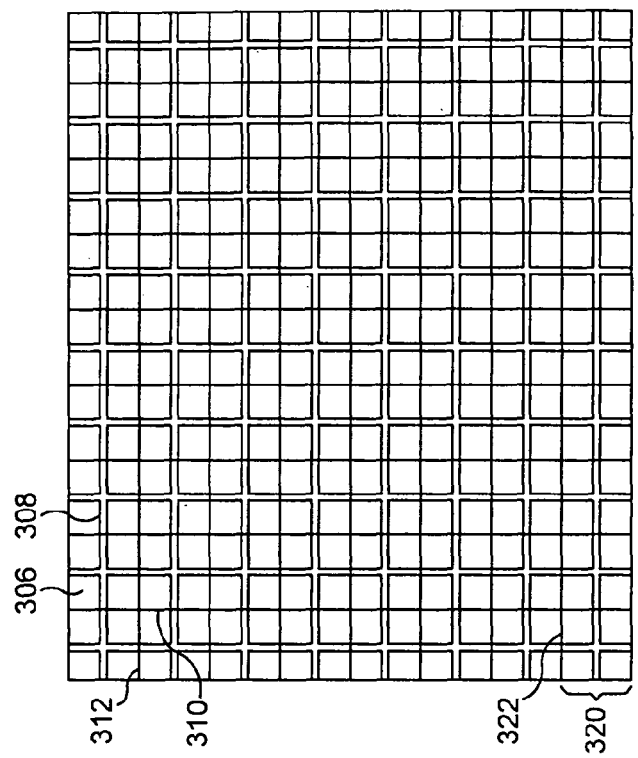

As shown in FIG. 9, the resultant co-extruded layer 320 comprises columns of two foam segments 306 mutually bonded in the thickness direction by unfoamed walls 308 which extend in the width direction of the layer 320. In addition, the co-extruded layer 320 comprises rows of foam segments 306 mutually bonded in the width direction either by interconnected segment surfaces 310 which extend in the thickness direction of the layer 320 or by unfoamed walls 308 which extend in the thickness direction of the layer 32. Adjacent layers 320 of the stack are disposed one above the other so that the unfoamed walls 308 of adjacent layers intersect to form a network of such unfoamed walls 308 throughout the stack. The network extends throughout the entire thickness and width of the layer 320. The adjacent layers 320 are mutually bonded by interconnected layer surfaces 322.

For the embodiments of FIGS. 6 to 9, the unfoamed walls are formed of a thermoplastic material such as polypropylene (PP), PET, SAN, PS, a PS/PPO blend, polycarbonate (PC) or a PC/PET blend. The foam segments can be of the same or different materials. For example, some segments may be composed of a first foam material and adjacent foam segments may be composed of a second foam material. If desired, both the foam segments and the walls may be composed of the same material, to aid recycling. The provision of rigid walls between the foam segments can readily be achieved by co-extrusion using the method and apparatus of the present invention in a variety of different layer/wall configurations. The resultant structure has improved mechanical properties, particularly shear and compression properties, as compared to the use of foam material alone.

The invention eliminates the post welding and gluing operation. The layer width can extend across the entire width of a desired core of a large dimension composite sandwich structural component, such as a wind turbine blade. The block which is formed can be cut into a plurality of individual sheets along a cutting line which is orthogonal to the plane of the multiple layers. This provides that the foam extrusion direction is aligned with the thickness direction of the sheet which maximises the mechanical properties and the material efficiency of the foam in the resultant composite component. The foam layers can be extruded so as to have desired width of the resultant composite component so as to minimise material wastage and labour associated with a foam surface grinding step. The final foam sheet may therefore have better surface quality and potentially better mechanical properties than using known methods.

The apparatus of the present invention can readily be integrated into a conventional foam extrusion line.

The present invention may be used to produce laminated structural foam products for use in any application requiring a structural foam core, for example in the marine or civil engineering market, or for use in the manufacture of wind turbine blades.

The present invention provides a number of technical and commercial benefits as compared to known products and processes. For example, the production process requires a reduced cycle time of production, and also reduced manpower, because of the omission of a separate step after the extrusion step to weld or adhere the foam boards together; a reduced scrap rate of the foam, since reduced regrind material is produced; and a reduced total capital investment is required for the foam extrusion line, because of the omission of a separate lamination facility. The process also provides the possibility to have reinforcement materials between each layer, which reinforcement materials have been incorporated on-line, during the extrusion and laminating process. The product can have the advantages of a lower manufacturing cost than products produced using post-extrusion off-line lamination. In addition, the product can exhibit increased mechanical properties.

The invention claimed is:

1. A method of producing a laminated body of structural thermoplastic foam, the method comprising the step of successively extruding a plurality of foam layers from an extrusion die, each next layer being extruded onto a previously extruded layer, to form a stack of mutually bonded layers, the same extrusion die forming a plurality of individually extruded layers of the stack, wherein after each layer has been extruded, the layer is cut into at least two layer portions to form at least two independent blocks, each block comprising a respective stack of a plurality of mutually bonded layers.

2. A method according to claim 1 wherein the extrusion die and the stack are relatively moved translationally during extrusion of each foam layer.

3. A method according to claim 1 wherein a single extrusion die extrudes all of the layers of the stack.

4. A method according to claim 1 wherein the extrusion die is continuously operated.

5. A method according to claim 1 wherein the extrusion die is fixed in position and the stack is translationally moved under the extrusion die during extrusion of each foam layer.

6. A method according to claim 5 wherein the stack is translationally moved at a velocity greater than the velocity of the extruded foam layer exiting the extrusion die thereby anisotropically to stretch cells of the foam layer in the moving direction.

7. A method according to claim 5 wherein the stack is translationally moved by a conveyor system in a single direction under the extrusion die during extrusion of each foam layer.

8. A method according to claim 7 wherein the conveyor system translationally moves the stack around a loop, the extrusion die being located at one position above the loop.

9. A method according to claim 8 wherein the loop is substantially horizontal.

10. A method according to claim 7 wherein the conveyor system translationally moves the stack around a loop, the extrusion die being located at one position above the loop, and wherein the layer is cut into at least two layer portions to form at least two independent blocks, and the blocks are conveyed around the loop so that when one block is under the extrusion die, the other block or blocks is or are being cut downstream of the extrusion die and/or being conveyed around the loop to a position upstream of the extrusion die.

11. A method according to claim 7 wherein the layer is cut while the layer is moving on the conveyor system downstream of the extrusion die and the cutting is carried out by a cutter mechanism moving downstream of the extrusion die at the same velocity as the layer.

12. A method according to claim 5 wherein the stack is translationally moved by a conveyor system in reciprocal directions under the extrusion die during extrusion of the foam layers so that one foam layer is extruded with the stack moving in a first direction and a successive foam layer is extruded with the stack moving in a second opposite direction.

13. A method according to claim 1 wherein a radiation heater is mounted adjacent to the extrusion die for heating a foam surface onto which a foam layer is to be extruded.

14. A method according to claim 13 wherein a calibration tool is mounted adjacent to the radiation heater to shape the upper surface of the extruded foam layer.

15. A method according to claim 1 wherein the laminated body is formed on a table having an adjustable height.

16. A method according to claim 15 wherein after the extrusion of at least one of the layers onto the previously extruded layer or layer, the height of the table is lowered in an indexable manner by a distance substantially corresponding to an increase in the thickness of the stack of foam layers.

17. A method according to claim 16 wherein the height of the table is lowered in an indexable manner by a distance substantially corresponding to a thickness of the foam layer after the extrusion of each foam layer onto the previously extruded layer.

18. A method according to claim 1 wherein the extrusion die has a plurality of extrusion orifices and each extruded foam layer comprises a plurality of co-extruded foam segments bonded together.

19. A method according to claim 18 wherein the foam layer has a plurality of foam segments in both the width and thickness directions of the extruded foam layer.

20. A method according to claim 18 wherein the extrusion die co-extrudes foam segments and unfoamed walls between foam segments.

21. A method according to claim 20 wherein the walls extend in the thickness direction of the extruded foam layer.

22. A method according to claim 21 wherein the walls additionally extend in the width direction of the extruded foam layer, to form a network of intersecting orthogonal walls in the foam layer.

23. A method according to claim 20 wherein the walls of adjacent foam layers intersect.

24. A method according to claim 20 wherein the walls are composed of a thermoplastic material.

25. A method of producing a laminated body of structural thermoplastic foam, the method comprising the step of successively extruding a plurality of foam layers from an extrusion die, each next layer being extruded onto a previously extruded layer, to form a stack of mutually bonded layers, the same extrusion die forming a plurality of individually extruded layers of the stack, wherein after each layer has been extruded, the layer is cut into at least two layer portions to form at least two independent blocks, each block comprising a respective stack of a plurality of mutually bonded layers, and wherein the stack is translationally moved by a conveyor system in a single direction under the extrusion die during extrusion of each foam layer.

* * * * *